Oct. 29, 1968
W. A. RAY
3,407,708
FLUID CONTROL SYSTEM
Filed Jan. 12, 1966
3 Sheets-Sheet 2
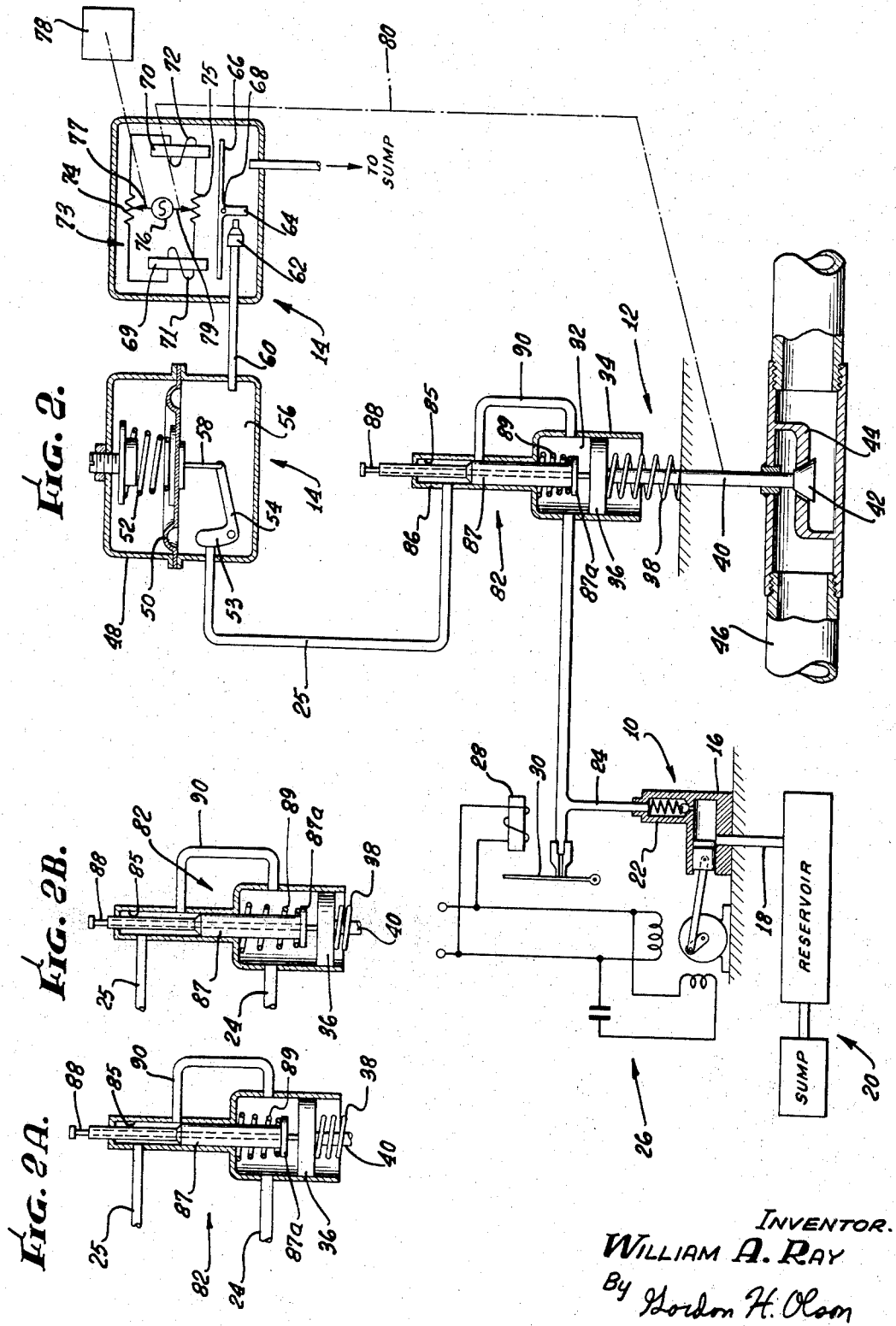
INVENTOR.
WILLIAM A. RAY
By Gordon H. Olson
ATTORNEY.

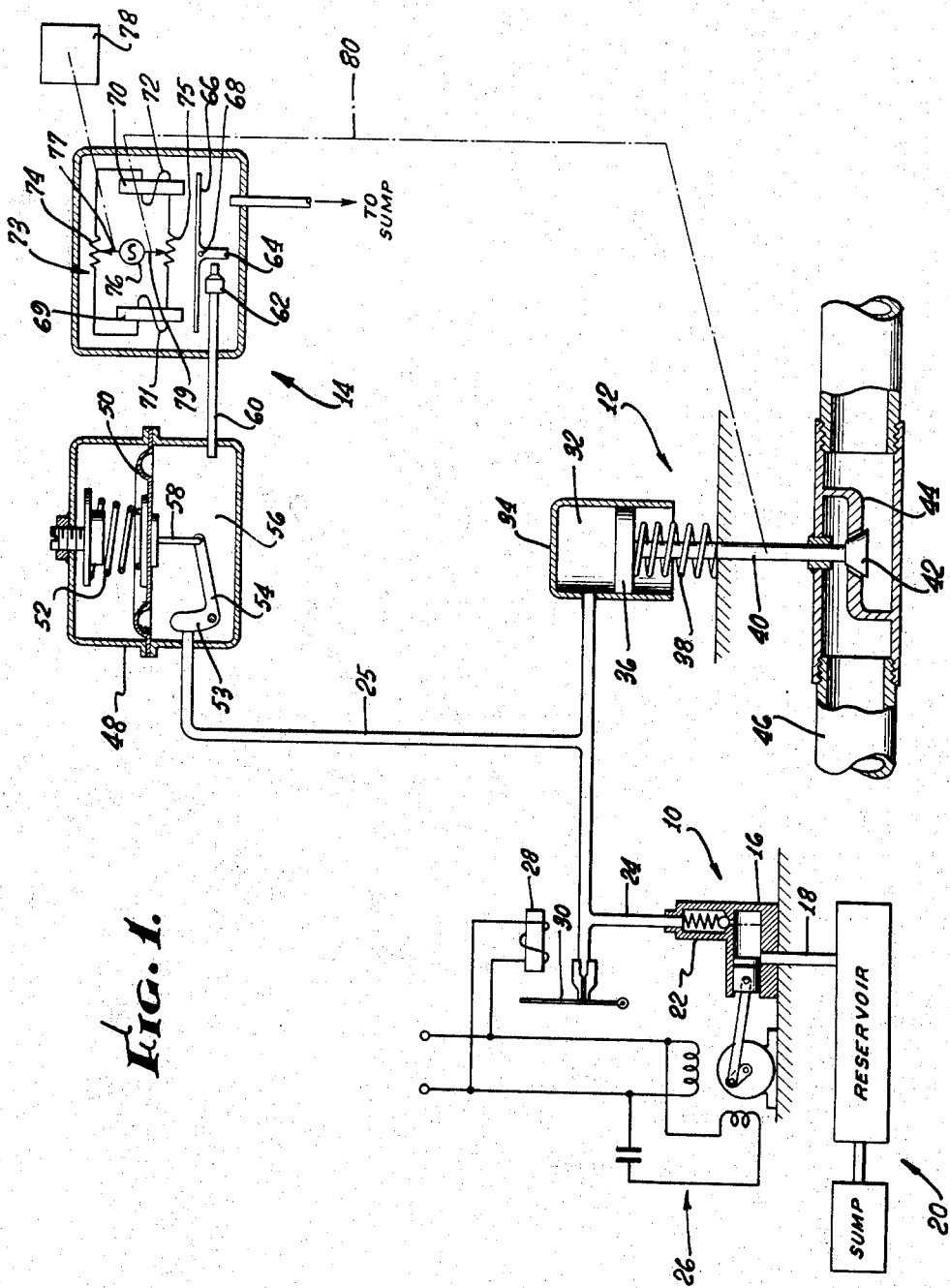

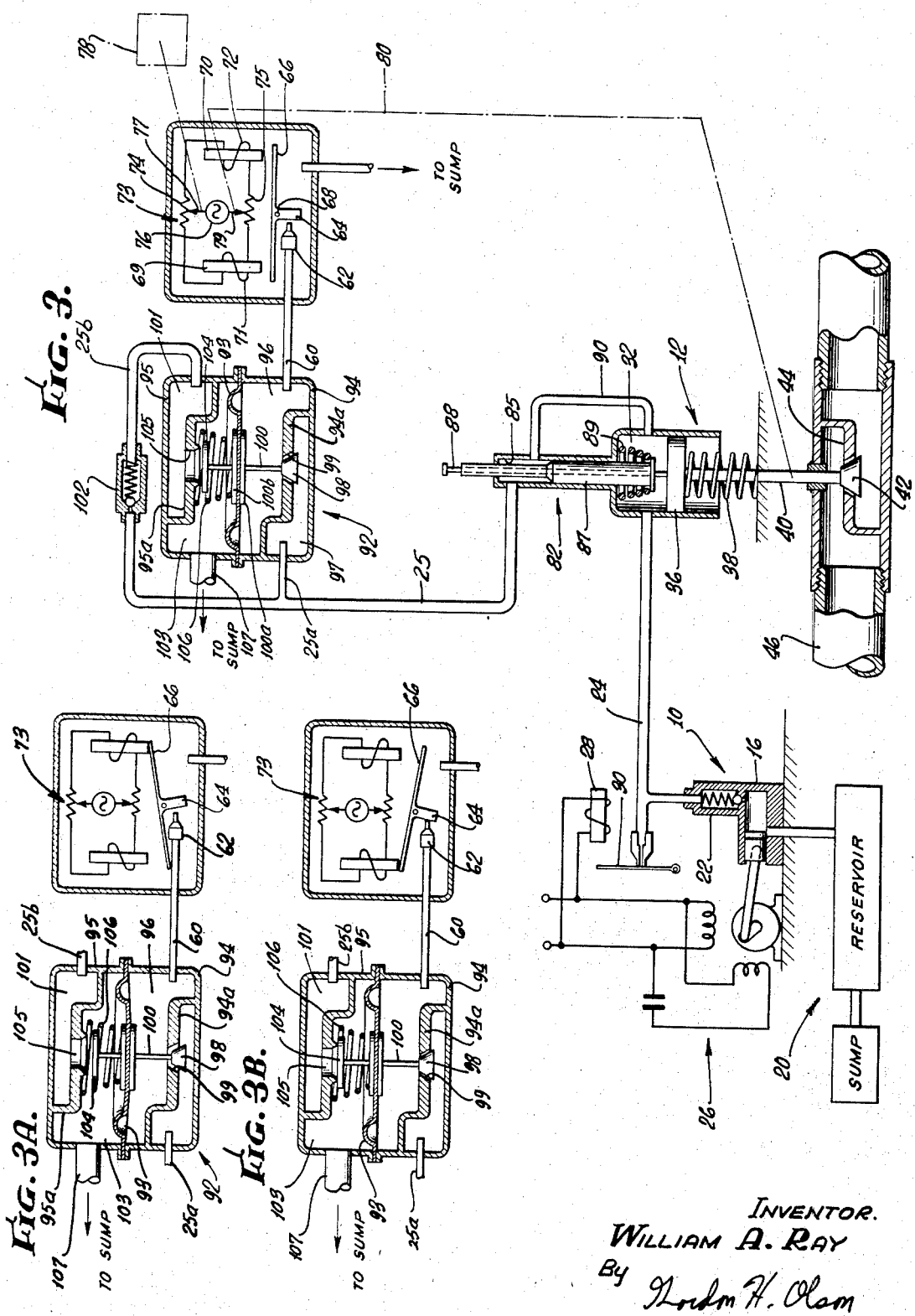

United States Patent Office 3,407,708
Patented Oct. 29, 1968

3,407,708
FLUID CONTROL SYSTEM
William A. Ray, North Hollywood, Calif., assignor to International Telephone and Telegraph Corporation, New York, N.Y., a corporation of Maryland
Filed Jan. 12, 1966, Ser. No. 520,154
7 Claims. (Cl. 91—48)

ABSTRACT OF THE DISCLOSURE

The system generally includes a source of pressurized fluid connected to operate a displaceable actuator, and valve arrangements for bleeding pressure from the system to control movement of the actuator. An additional valve or blocking arrangement determines the amount of displacement of the actuator before bleeding is initiated. Valve means are also provided for initiating and terminating operation of the actuator rapidly by controlling the rate of bleeding.

---

The present invention relates to fluid control systems wherein it is desired to accurately position or adjust a control element such as, for example, a valve, damper, gate or the like. More specifically, it relates to improvements to such a control system, particularly of the type disclosed in U.S. Patent 3,087,471 by William A. Ray, assigned to the same assignee as the present invention.

Briefly, a system of the type disclosed in the patent includes a source of pressure connected to operate a device such as an actuator and a means for bleeding pressure from the system to control pressure in the system and hence, movement of the actuator. In certain applications of such a system, it is desirable that a certain minimum movement of the actuator take place before the pressure bleeding means becomes effective. For example, if the actuator is used to control a main valve in a fuel line, it may be desirable to maintain a minimum fuel flow sufficient for low-fire operation before any bleed control takes effect. This minimizes the possibility of a dangerous condition wherein a failure permits gas flow without combustion.

Accordingly, it is a primary object of this invention to provide an improvement in a control system to accomplish the above indicated feature.

It is a more specific object of this invention to provide a fluid control system having a pressure bleed control arrangement which does not become effective until a predetermined minimum movement of the device being controlled has taken place.

Another object of this invention is to provide an improved pressure regulating system for a fuel line having a very simple and highly reliable arrangement for insuring minimum movement of a device before pressure regulation of the system commences, thereby minimizing the possibility of fuel flow without combustion.

In accordance with the invention, the pressure bleeding means in the control system described above is initially blocked by a valve or similar means controlled by movement of the device being operated by the control system. Such an arrangement is very reliable and simple since it acts directly and positively, whereby the possibility of a failure is reduced.

Further features, objects and attendant advantages will become apparent with reference to the following description and drawings, wherein:

FIG. 1 is a schematic showing of a prior art control system as disclosed in the above referenced patent;

FIG. 2 is a schematic showing of a control system similar to that of FIG. 1, but including the improved minimum flow mechanism of the invention;

FIGS. 2A and 2B show the minimum flow mechanism of FIG. 2 in different operating positions;

FIG. 3 shows the system of FIG. 2 with an improved modification of a force amplifier valve in the bleed system; and FIGS. 3A and 3B show the bleed mechanism of FIG. 3 in different operative positions.

Referring to the drawings and first to FIG. 1, there is schematically illustrated a control system including a pressure source 10 operating an actuator mechanism 12 and controlled by a pressure bleed arrangement 14. The pressure source is shown by way of illustration as a positive displacement pump 16 having an inlet pipe 18 connected to a suitable fluid sump and reservoir 20 and an outlet valve 22 connected to a conduit 24. The pump 16 is driven by suitable electrical means 26, incorporating an electromagnetic device 28 for operating safety valve 30 connected to conduit 24 when the device is unenergized.

The pump output is conducted through conduit 24 to a main pressure chamber 32 defined by actuator cylinder 34 and the upper surface of actuator piston 36 urged upwardly by spring 38 surrounding piston rod 40. Rod 40 is attached to a valve member 42 controlling the flow of fluid through valve seat 44 located in conduit 46. Such a valve and conduit might be utilized in various applications. For example, conduit 46 might represent a fuel line in a large industrial heating system. It will be appreciated that the position of valve member 42 and actuator 36 piston is dependent on the pressure in conduit 24.

The pressure bleed arrangement 14 is connected to the pressure source by conduit 25 leading to a valve housing 48 containing a flexible diaphragm 50 urged downwardly by spring 52. Fluid under pressure in line 25 is allowed to flow past valve 53 and valve member 54, schematically illustrated as a bellcrank or lever, into chamber 56. The valve member 54 serves to automatically throttle the pressure by action of diaphragm 50 being connected by rod 58 to the valve.

Chamber 56 has an outlet opening through conduit 60 leading to spill valve 62 comprising a stationary port controlled by a flap 64 extending centrally from the pivoted magnetizable armature member 66 which is pivoted at 68 and which cooperates magnetically with core members 69 and 70 inside of spaced coils 71 and 72 respectively.

These coils 71 and 72 are connected electrically in a bridge type circuit 73 with potentiometer type resistances 74 and 75 and a suitable A.C. power source 76. Tap 77 on resistance 74 is manually adjustable or automatically adjustable through a suitable control 78. Tap 79 is mechanically coupled by connection 80 (shown in dotted lines) to actuator position rod 40 controlling valve 42.

In operation of the system shown in FIG. 1, the tap 77 is manually adjusted to a particular position, which may be calibrated to correspond with the position of valve member 42. Should the valve member 42 tend to move from this position, the position of the mechanically coupled tap 79 tends to change also. However, this tendency to move is counteracted by an automatic change in pressure in conduits 24 and 25, and chamber 32.

Movement of tap 79 causes movement of flap 64, thus increasing or decreasing the fluid flow through port 62. This in turn varies the pressure in chamber 56 and the position of diaphragm 50, the resulting movement causing movement of valve 54, thus affecting the fluid flow from conduit 24 and the pressure in the conduit. This change transmitted to actuator piston 36 tends to restore the valve 42 to its initial position. It should be noted that the flow capacity of port 62 is greater than that of valve 53 so that continuous flow is assured through port 62.

It will be appreciated that this arrangement employing the force multiplying action of valve 54 and diaphragm 50 allows the use of a small force applied to valve 62, 64 to effect control of high pressures at valve 53 by pressure amplification. This pressure amplification is determined essentially by the ratio of diaphragm area multiplied by the mechanical advantages of the linkage system 54, 58 to the area of the nozzle comprising valve port 62.

Further details of the foregoing described system may be obtained from U.S. Patent 3,087,471.

While the foregoing arrangement performs highly satisfactorily, it is desired in certain applications that no bleeding of pressure should take place below a predetermined minimum open position of valve 42. For example, in a fuel line it may be necessary to maintain adequate fuel flow to sustain combustion in order to preclude a dangerous condition wherein gas flows with no combustion.

In accordance with the invention, there is provided, as shown in FIG. 2, a unique and highly reliable, direct acting minimum flow valve mechanism 82 for blocking or preventing the action of the bleeding arrangement 14. This mechanism includes a valve chamber 85 defined by cylinder 86, shown schematically as an extension of cylinder 34. Within cylinder 86 is a valve member 87 which extends into cylinder chamber 32. An adjustment member 88 threadably mounted within valve member 87 engages the upper surface of piston 36 while spring 89, extending between the upper wall of cylinder 34 and a flange 87a formed on the lower end of valve member 87, urges the member into engagement with piston 36, which position of the piston determines the location of valve member 87. From the drawing it can be seen that valve member 87 controls the flow of fluid through passage or conduit 90 extending between chamber 32 and chamber 85.

By properly designing valve mechanism 82, a predetermined minimum flow is allowed to pass through valve 42, 44 before the pressure bleeding arrangement 14 is placed into operation. As seen in FIG. 2, valve member 87 is blocking fluid flow through chamber 85; while in FIG. 2A, the piston has moved downwardly under increased pressure so that the valve member 87 permits fluid flow into chamber 85; and in FIG. 2B, flow is unobstructed.

It should be noted that although piston 36 is responsive to pressure in chamber 32, the minimum flow valve 82 is, strictly speaking, responsive to movement of piston 36 rather than pressure. Hence, if there should be some malfunction of the actuator mechanism 12 such that it fails to respond immediately to pressure changes, the minimum flow valve will prevent operation of the bleed arrangement 14.

Consider now, the modification of the invention shown in FIG. 3, which employs the same minimum flow valve mechanism 82, but which utilizes an improved bleed and force amplifier valve mechanism 92. In order to obtain a high degree of force amplification of the arrangement shown in FIGS. 1 and 2, it is necessary that the flow capacity of valve 53, 54 be kept small. However, this results in relatively slow response time when the demand flow signaled at valve 62, 64 is large. The valve mechanism 92 uniquely solves this problem by introducing an additional valve which functions in high demand conditions to speed response time.

As seen in FIG. 3, a diaphragm 93 is clamped between housing sections 94 and 95. Section 94 with its inner wall 94a cooperates with the diaphragm to define a chamber 96. The opposite side of wall 94a forms a wall of inlet chamber 97 in communication with conduit 25 through passage 25a. A valve member 98 carried by rod 100 attached to disc 100a mounted on diaphragm 93 cooperates with valve orifice 99 in wall 94a to control the flow of fluid from chamber 97 to chamber 96.

Casing section 95 includes an inner wall 95a which, with the outer wall of the section forms inlet chamber 101 in communication with conduit 25 by means of one way check valve 102 and conduit 25b. Section 95 and its wall 95a also form chamber 103 in conjunction with diaphragm 93. A valve member 104 connected to rod 100 attached to disc 100b mounted on the diaphragm controls the flow of fluid through valve orifice 105 in wall 95a. Spring 106 surrounding rod 100 extends between wall 95a and the disc 100b to urge valve member 104 and valve member 98 in valve opening direction. A large outlet 107 in casing section 95 connected to sump 20 insures that the chamber does not affect the diaphragm position.

In operation of the high speed valve mechanism 92, consider first a steady state condition as shown in FIG. 3. In this condition, the minimum flow valve mechanism 82 is open and control armature 66 is unenergized so that a desired pressure is being maintained on actuator piston 36. Fluid flow from chamber 97, which is at the pressure of conduit 25, is metered through amplifier valve 98, 99 as determined by diaphragm 93 and the pressure in chamber 96 is controlled by valve 62, 64. Any excess fluid is directed through check valve 102, conduit 25b, chamber 101, valve 104, 105 into reduced pressure chamber 103 in communication with sump 20.

In the event it is desired to move fuel valve 42 rapidly in the valve closing direction, coil 72 is energized causing armature 66 and flap 64 to assume the extreme open position with respect to port 62, as shown in FIG. 3A. This immediately causes a pressure drop in chamber 96 of the amplifier valve mechanism 92 with the result that diaphragm 93 is moved downwardly to open valve 98, 99 a greater amount. In the absence of valve 104, 105, the speed of reduction in pressure on actuator piston 36 is determined by the fluid flow through amplifier valve 98, 99; and since this flow is relatively small to attain high force amplification from the system, response time is somewhat slow in a high volume system. However, in accordance with the invention, the downward movement of diaphragm 93 has also opened high capacity valve 104, 105, with the result that the pressure in the system quickly drops to obtain the desired movement of valve 42.

At this point it should be noted that check valve 102, which is set to open under a set pressure such as two or three p.s.i. maintains valve 98, 99 under pressure.

The reverse situation to that of FIG. 3A is shown in FIG. 3B wherein spill valve port 62 is closed to cause a buildup of pressure in the system and resultant movement of valve 42 in an opening direction. The increase in pressure in chamber 96 is determined by the capacity of valve 98, 99; however, since chamber 96 is relatively small, the buildup is relatively rapid. Also, the length of rod 100 with respect to valve member 98 and valve member 104 is such that valve 98, 99 remains slightly open when valve 104, 105 is closed. Accordingly, it can be seen that a unique and reliable high speed hydraulic amplifier valve is obtained.

While particular embodiments of the present invention have been shown and described, it will be obvious to those skilled in the art that various changes and modifications may be made without departing from this invention in its broader aspects. Therefore, it is intended that the appended claims cover all such changes and modifications as fall within the true spirit and scope of this invention.

What I claim is:
1. In a fluid circuit including a source of fluid under pressure and a device actuable by pressure in the circuit, a control system comprising:
(a) a main pressure chamber and fluid pressure amplification means serially interposed in the fluid circuit;
(b) a piston forming one wall of the pressure chamber and displaceable in proportion to pressure in the pressure chamber, said device being actuable by displacement of said piston; and
(c) bleed valve means outside the pressure chamber operatively connected to the interior of said chamber and actuable by displacement of the piston to open or close the valve to bleed pressure from the pressure chamber to limit displacement of the piston, and the operation of said amplification means being initiated coincident with the opening of the bleed valve means.

2. The combination according to claim 1, in which said bleed valve means includes a valve chamber serially interposed in said fluid circuit between said main pressure chamber and said amplification means, and said bleed valve means including a valve element in said valve chamber operative upon a predetermined displacement of the piston to open the bleed valve means and bleed fluid under pressure from the main pressure chamber through the valve chamber to said amplification means.

3. The combination according to claim 1, in which said fluid pressure amplification means includes a housing, a pressure responsive diaphragm within the housing, an inlet chamber within the housing on each side of the diaphragm, said inlet chambers connected in parallel in said fluid circuit, and valve means operatively associated with said inlet chambers and displacement of said piston to relate the pressure in said inlet chambers to the pressure in said main pressure chamber.

4. A control system comprising:
  (a) a fluid pressure source;
  (b) conduit means having one end connected to said source;
  (c) a device connected to said conduit means operated by fluid pressure developed by said source;
  (d) means connected to said conduit means for bleeding the pressure in said conduit means to control the pressure applied to said device, said bleeding means including:
    (1) first and second valves spaced in said conduit means through which fluid from said source flows through said first and second valves in that order,
    (2) a pressure responsive diaphragm interposed between said first and second valves,
    (3) means connected to said first valve for controlling the same in accordance with pressure on said diaphragm,
    (4) means controlling said second valve for controlling the pressure on said diaphragm,
    (5) a third valve positioned in said conduit means in parallel with said first valve and controlling flow to a reduced pressure area, and
    (6) means connected to said third valve for controlling the same in accordance with pressure on said diaphragm, movement of said diaphragm in one direction tending to open said first and third valves and movement in the opposite direction tending to close the valves, said third valve having a considerably greater capacity than said first valve so that said third valve assists said first valve in handling large volume pressure bleeding as called for by said second valve; and
  (e) means blocking said bleeding means until said device has been actuated a minimum amount by the pressure applied to the device.

5. The combination according to claim 4, in which a check valve is provided in said conduit means for permitting only one-way flow through said third valve above a predetermined minimum.

6. The combination according to claim 4, in which said first valve is positioned on one side of said diaphragm and said third valve is positioned on the other side of said diaphragm, and spring means for biasing said diaphragm in a direction to open said first and third valves in opposition to conduit pressure between said first and second valves biasing the diaphragm in a valve closing direction.

7. The combination according to claim 4, in which said first valve is partially open when said third valve is completely closed.

References Cited

UNITED STATES PATENTS

| | | | |
|---|---|---|---|
| 2,251,729 | 8/1941 | Bach | 91—48 |
| 2,372,393 | 3/1945 | Ray | 91—48 |
| 2,769,429 | 11/1956 | Lencioni | 91—400 |
| 2,810,930 | 10/1957 | MacDonald et al. | 91—400 |
| 3,087,471 | 4/1963 | Ray | 91—48 |
| 2,129,083 | 9/1938 | Carter | 91—404 |
| 3,071,146 | 1/1963 | Friedell | 137—489.5 |

MARTIN P. SCHWADRON, *Primary Examiner.*

B. L. ADAMS, *Assistant Examiner.*